(12) United States Patent
Storaci et al.

(10) Patent No.: US 11,472,379 B1
(45) Date of Patent: Oct. 18, 2022

(54) AUTOMATIC VEHICLE ELEVATION SYSTEM

(71) Applicants: Salvatore Storaci, Carol Stream, IL (US); Paolo Storaci, Carol Stream, IL (US)

(72) Inventors: Salvatore Storaci, Carol Stream, IL (US); Paolo Storaci, Carol Stream, IL (US)

( * ) Notice: Subject to any disclaimer, the term of this patent is extended or adjusted under 35 U.S.C. 154(b) by 0 days.

(21) Appl. No.: 17/689,971

(22) Filed: Mar. 8, 2022

Related U.S. Application Data

(60) Provisional application No. 63/158,269, filed on Mar. 8, 2021.

(51) Int. Cl.
*B60S 9/04* (2006.01)
*H04W 4/80* (2018.01)
*H04W 4/40* (2018.01)

(52) U.S. Cl.
CPC .............. *B60S 9/04* (2013.01); *H04W 4/40* (2018.02); *H04W 4/80* (2018.02)

(58) Field of Classification Search
CPC ...... B60S 9/02; B60S 9/10; B60S 9/12; B60S 9/04; H04W 4/40; H04W 4/80
See application file for complete search history.

(56) References Cited

U.S. PATENT DOCUMENTS

| | | | | |
|---|---|---|---|---|
| 5,224,688 A * | 7/1993 | Torres | ................. | B60S 9/12 254/423 |
| 5,232,206 A * | 8/1993 | Hunt | ................. | B60S 9/12 254/423 |
| 5,765,810 A * | 6/1998 | Mattera | ................. | B60S 9/12 254/423 |
| 6,318,508 B1 * | 11/2001 | Inoue | ................. | B66B 1/18 187/394 |
| 6,913,248 B1 * | 7/2005 | Schmitz | ................. | B60S 9/12 254/423 |
| 6,991,221 B1 * | 1/2006 | Rodriguez | ................. | B60S 9/12 254/423 |
| 8,919,739 B1 * | 12/2014 | Romero | ................. | B60S 9/12 254/423 |
| 10,960,856 B1 * | 3/2021 | Weddle | ................. | B66F 3/46 |
| 2015/0127216 A1 * | 5/2015 | Jackson, Sr. | ................. | B60S 9/12 701/36 |
| 2017/0225663 A1 * | 8/2017 | Sanchez | ................. | B60S 9/12 |
| 2022/0250591 A1 * | 8/2022 | Chuol | ................. | B60S 9/12 |

* cited by examiner

*Primary Examiner* — Seahee Hong
(74) *Attorney, Agent, or Firm* — Steven Ivy P.C.

(57) ABSTRACT

Disclosed is a system for automatically elevating vehicles. The system is a substitute for standard, manually-operated car jacks, and jack stands. One or more systems may be installed underneath a vehicle. To lift a vehicle off the ground, the system utilizes a multi-stage actuator. The actuator may be powered, by either DC motor system, AC motor system, pneumatic system, or hydraulic system. The actuator is protected from distractive external elements by being situated inside a housing, integrating a retractable, electric door. The actuator is equipped with a high load universal joint, and attached thereto durable, non-skid plate. Acting in unity, the universal joint and the non-skid plate, ensures that the vehicle being elevated remains level on uneven ground, and during the operation of the Elevation System. The end-user may initiate the operation of the Elevation System manually via a control panel, or via a mobile application.

19 Claims, 11 Drawing Sheets

AUTOMATIC VEHICLE ELEVATION SYSTEM

AUTOMATIC VEHICLE ELEVATION SYSTEM

RELATED PATENT APPLICATION

The present Non-Provisional U.S. Patent Application claims the priority from U.S. Provisional Patent Application No. 63/158,269 filed on Mar. 8, 2021, the subject matter of which is incorporated herein by reference.

FIELD OF THE INVENTION

The present invention addresses the general field of automobiles and associated therewith systems and accessories.

BACKGROUND OF THE INVENTION

In the United States alone, approximately 7 tire punctures occur every second, resulting in 220 million flat tires per year. Statistical data also shows that every U.S. driver will experience, on an average, up to 5 flat tires in their lifetime. The same statistical data was utilized to determine an average amount of flat tires occurring per year in other countries or continents, and the results are quite staggering. In Europe, for example, it is estimated that over 492 million flat tires occur per year, and in China, the number of flat tires per year is rapidly approaching 1 billion.

These numbers may be viewed by many as anecdotal, and of small significance, as the cost to repair a tire is relatively low. However, this perspective changes very quickly when we analyze the statistical data addressing usage and failure of tire jacks; wherein said tire jacks are devices used to lift a motor vehicle off the ground for servicing or other repairs.

Specifically, the NHTSA's National Center for Statistics and Analysis (NCSA) recently examined data from the Consumer Product Safety Commission's (CPSC) National Electronic Injury Surveillance System (NEISS) on cases involving injuries associated with motor vehicle "jack failures." "Jack failures" are defined as situations in which the vehicle is believed to have moved either as a result of the jack or car shifting, or as a result of the jack collapsing or losing pressure needed to hold the vehicle.

The NEISS data on persons treated in hospital emergency rooms for these injuries were examined to determine the action and activity involved in producing the injury, the injury diagnosis and severity, the body region most often injured, and the age of the injured person.

About 81 percent (3,914) of the vehicles involved in motor vehicle jack failures during the study period were classified as passenger cars. Trucks of unknown type comprise 13 percent (646) of the estimated injuries. The types of situations reported by persons injured by motor vehicle jack failures appear to be associated with the jack or vehicle slipping and falling or the jack itself failing or losing pressure causing the vehicle being lifted to drop. Approximately three-fourths (74%) of the persons injured in motor vehicle jack failures were injured as a result of being struck by the vehicle as it fell from the jack. It is estimated that at the time of the jack failure about 1,938 persons (40%) were utilizing the jack to facilitate the repair of the vehicle in some way. Another 913 (19%) persons were injured as they used the jack to lift the vehicle while attempting to change a tire. About 1,879 (39%) of those persons injured in jack failure incidents sustained most severe injuries to either the hand, wrist or finger. An estimated 834 persons suffered most severe injuries to the upper trunk of the body (17%), followed by 745 injuries to the head, neck or face (15%), 490 (10%) injuries to the shoulder, about 314 (7%) injuries to the arm, 244 to the foot (5%), 189 to the lower trunk (4%) and about 2 percent of the most severe injuries were divided almost equally between the leg (68) and 25-50% of the body (60).

The present invention addresses, and largely resolves, the above-defined problems. The Automatic Vehicle Elevation System (the "system") enables the end-user to completely eliminate the need to use the traditional vehicle jack.

To raise the vehicle, the system utilizes either DC motor, AC motor, pneumatic, or hydraulic systems, powering multi-stage actuators. The actuators are located underneath the vehicles. When the vehicle is stationary, and the need to lift the vehicle arises, due to failure of a tire, the actuators are triggered by push of a button, and the vehicle is lifted, quickly and effortlessly.

The actuators are triggered via a stand-alone control unit directly tied the control system of the vehicle. The system, by changing the process of replacing a tire, instantaneously eliminates the common injuries occurring due to the jack failure. Moreover, the end-user's ability to raise the vehicle in seconds, without physical effort or stress, significantly reduces the time required to change the tire. This reduction in time, in turn, reduces the end-user's exposure to the dangers road conditions, which reduces the possibilities of injury, which translates into financial savings via reduction of insurance costs.

SUMMARY OF THE INVENTION

The following is intended to be a brief summary of the invention and is not intended to limit the scope of the invention:

The present invention discloses an automatic vehicle elevation system ("Elevation System"). The Elevation System allows the end-user to effortlessly elevate either side of the vehicle, or both sides simultaneously, thereby reducing the physical effort, necessary to change or replace the car's tire(s). The simultaneous elevation of the vehicle is also a direct substitute for standard jack stands. The jack stands are used to elevate vehicles that are stored for an extended period of time, to prevent the flat-spotting of tires. To elevate the vehicle, the Elevation System utilizes multi-stage actuator. The actuator is powered alternatively, by either of four systems: (1) DC motor system; (2) AC motor system; (3) pneumatic system; (4) hydraulic system. The actuator is protected from distractive external elements by being situated inside a housing, integrating a retractable, electric door. The actuator is equipped with a high load universal joint, and attached thereto durable, non-skid plate. Acting in unity, the universal joint and the non-skid plate, ensures that the vehicle being elevated remains level on uneven ground, and during the operation of the Elevation System. The end-user may initiate the operation of the Elevation System manually via a control panel, or via a mobile application. The mobile application, via interactive screens, allows the end-user to perform the vehicle safety check, extend the actuator, monitor the actuator progress, adjust or stop the actuator's functions, and retract the actuator.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DESCRIPTIVE KEY 100-Automatic Vehicle Elevation System ("Vehicle Elevation System" or "elevation system" or "car jack" or "present invention")

101-housing
102-actuator compartment
103-multi-stage actuator
104-high load universal joint
105-non-skid plate
106-controls compartment
107-retractable, electric door
108-linear slide
109-door motor
110-motor-to-door connecting mechanism
111-limit switch or micro switch
112-system controller (central processing unit)
113-Wi-Fi transmitter/receiver (Bluetooth enabling)
114-wireless charger transmitter/receiver
115-wireless light-emitting diode ("LED")
116-system battery & battery charge sensor
117-actuator motor (DC or AC)
118-motor-to-actuator connecting mechanism
119-power and communication conduit
120-compressor (if pneumatic system) or reservoir/pump (if hydraulic system)
121-check valve (for either pneumatic or hydraulic system)
122-control panel
123-master switch
124-static inverter
125-auto transformer unit
126-system control relay
127-magnetic sensor
128-proximity switch
129-engine running sensor
130-park brake sensor
131-car level sensor
132-car battery charge sensor
133-vehicle-connecting module
134-LVDT linear variable differential transformer/RVDT rotary variable differential transformer 200-mobile application
201-mobile phone
202-application opening button 210-first interactive screen
211-system check action button
212-engine on indicator
213-brake on indicator
214-car level indicator
215-battery level indicator 220-second interactive screen
221-start car jacks button
222-car jack positioning view
223-car jack progress indicator 224-car jack adjustment action button
225-stop button (car jack stop, action override)

DETAILED DESCRIPTION OF THE PREFERRED EMBODIMENT

Figure 1:
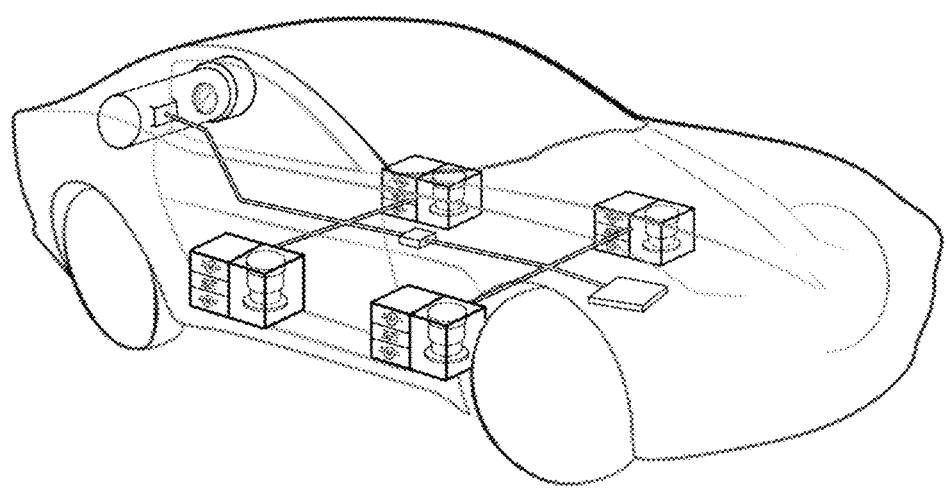
FIG. 1 is a perspective view of the present invention, the Automated Vehicle Elevation System (the "Elevation System"), showing an outline of a passenger vehicle, and the relative positioning of each Elevation System attached thereto; in accordance with an exemplary embodiment of the present invention.

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

As shown in FIG. 1, the present invention discloses an automatic vehicle elevation system 100 ("Elevation System"). The Elevation System allows the end-user to effortlessly elevate either side of the vehicle, or both sides simultaneously, thereby reducing the physical effort, necessary to change or replace the car's tire(s). The simultaneous elevation of the vehicle is also a direct substitute for standard jack stands. The jack stands are used to elevate vehicles that are stored for an extended period of time, to prevent the flat-spotting of tires.

Figure 2:
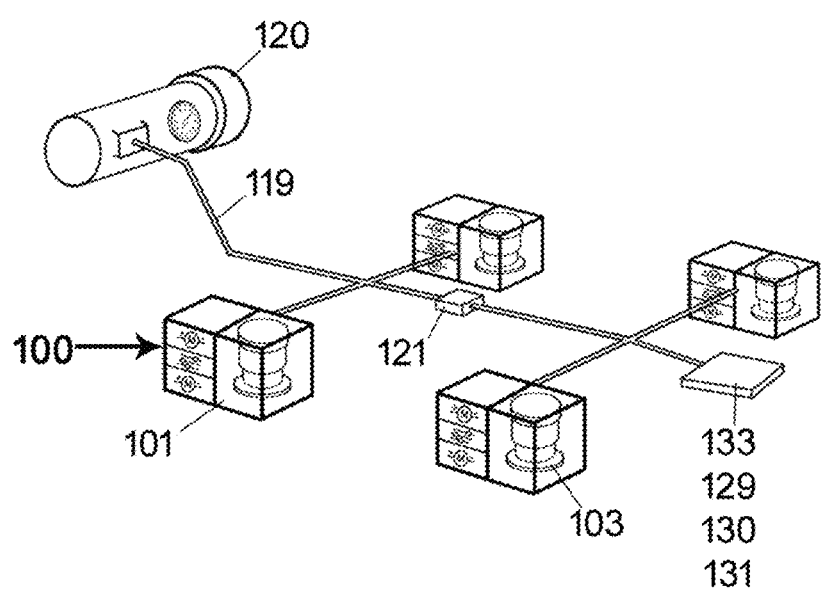
FIG. 2 is a perspective view of four Elevation Systems, interconnected via a power and communication conduit, showing the positioning of a compressor (if utilizing a pneumatic power) or a reservoir/pump (if alternatively utilizing a hydraulic system); in accordance with an exemplary embodiment of the present invention.
Figure 7:
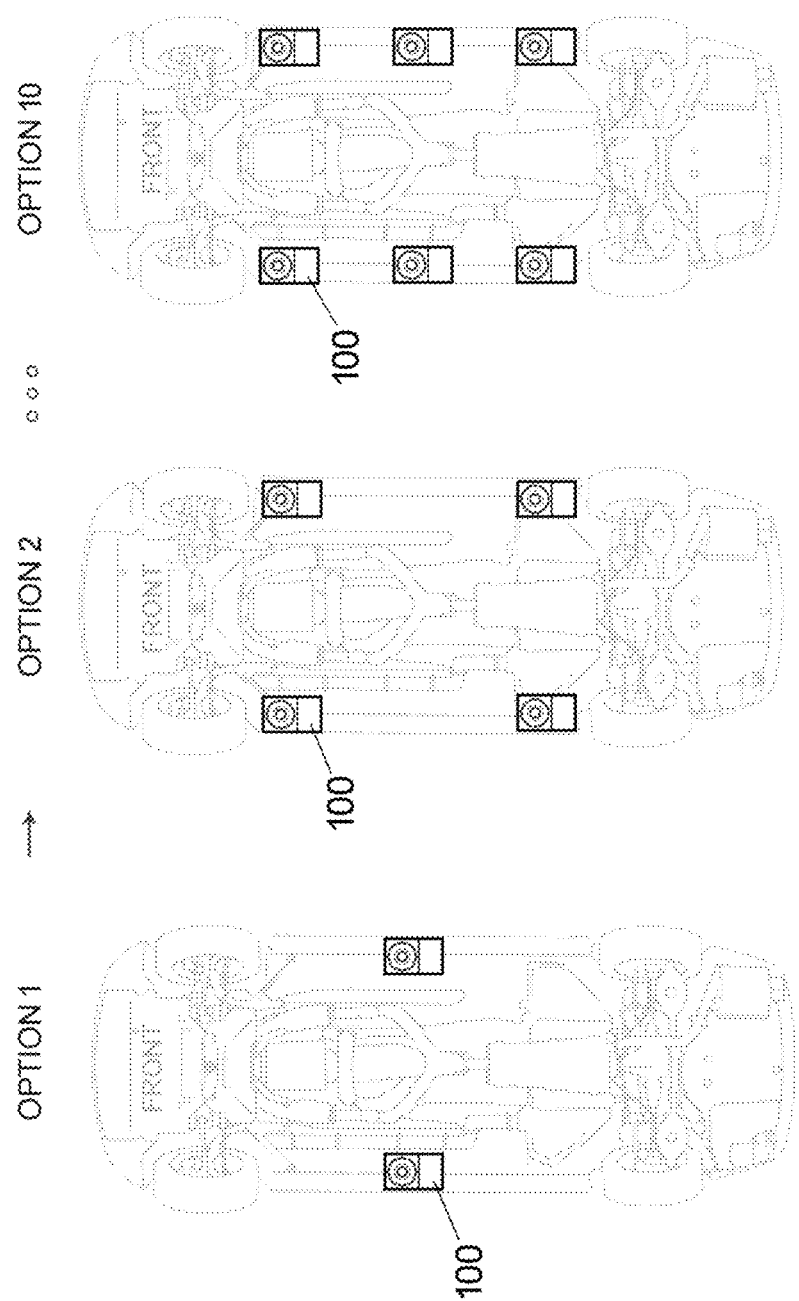
FIG. 7 shows possible positioning of multiple Elevation Systems on the undercarriage of a vehicle; wherein Option 1 shows the positioning of two Elevation Systems; Option 2 shows the positioning of four Elevation Systems; and Option 10 shows the positioning of four Elevation Systems; in accordance with an exemplary embodiment of the present invention.

As shown in FIGS. 1, 2, and 7, the end-user may utilize a multitude of the Elevation Systems 100, and install them underneath a vehicle in various positions. To lift a vehicle off the ground, the system utilizes a multi-stage actuator 103. The actuator 103 may be powered, by either DC motor system, AC motor system, pneumatic system, or hydraulic system. FIG. 2 is a perspective view of four Elevation Systems, interconnected via a power and communication conduit, showing the positioning of a compressor (if utilizing a pneumatic power) or a reservoir/pump (if utilizing a hydraulic system).

Figure 3:
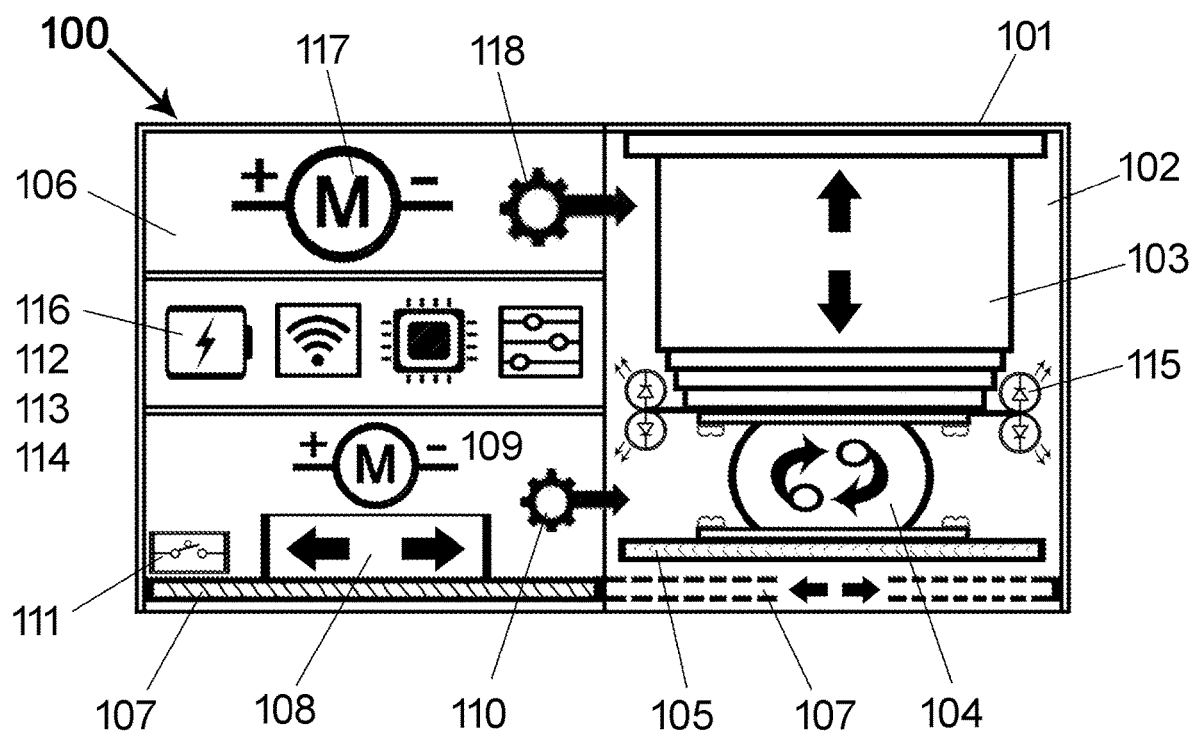
FIG. 3 is a front view of the Elevation System shown in a retracted position, inside the housing; the figure also shows the positioning of all primary components, including (1) actuator compartment; (2) actuator; (3) universal joint; (4) non-skid plate; (5) controls compartment; (6) electric door; (7) linear slide; (8) door motor; (9) system controller; (10) system battery and charge sensor; (11) actuator motor; in accordance with an exemplary embodiment of the present invention.
Figure 4:
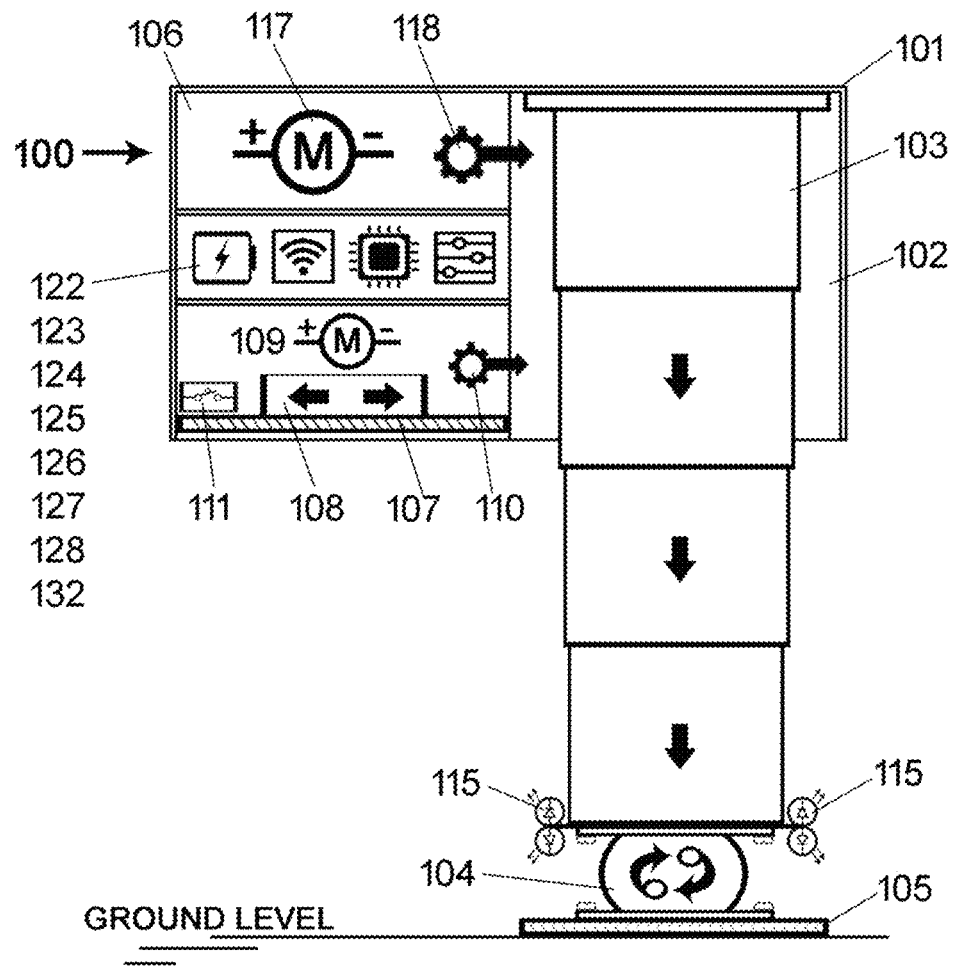
FIG. 4 is a front view of the Elevation System with an extended three-stage actuator, making contact with the ground level; the figure also shows the positioning of the retracted electric door, and the non-skid plate, connected to the actuator via high load universal joint; in accordance with an exemplary embodiment of the present invention.
Figure 5:
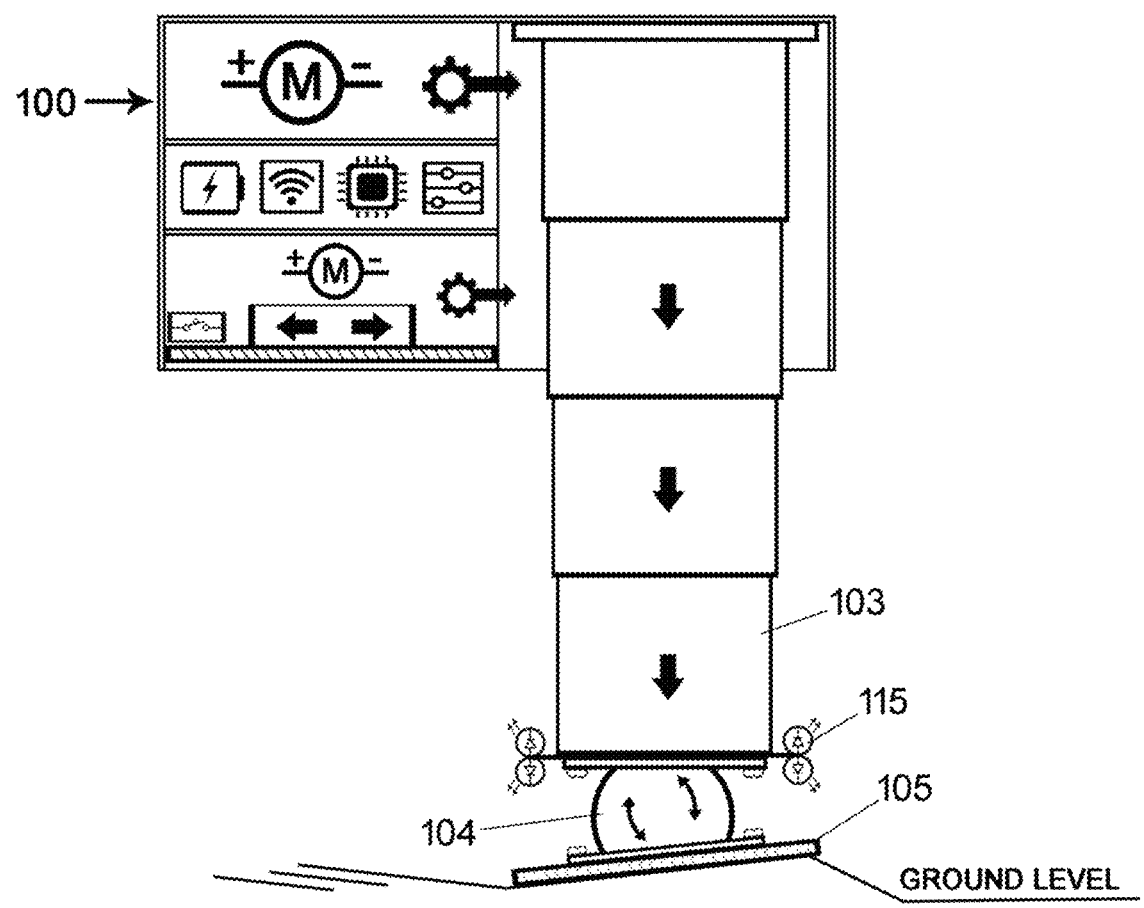
FIG. 5 is a front view of the Elevation System, designed to demonstrate the functionality of the non-skid plate, along with the universal joint, on uneven ground, and its ability to maintain the horizontal positioning of the actuator, which in turn ensures a level positioning of the vehicle being lifted off the ground; in accordance with an exemplary embodiment of the present invention.

As shown in FIGS. 3, 4 and 5, the actuator motor (AC or DC) 117 is connected the actuator 103 via the motor-to-actuator connecting mechanism 118. The system controller 112 is configured to keep the voltage utilized by the actuator motor 117 consistent, and if necessary implement adjustments, via the feedback provided by the autotransformer unit 125.

Figure 8:
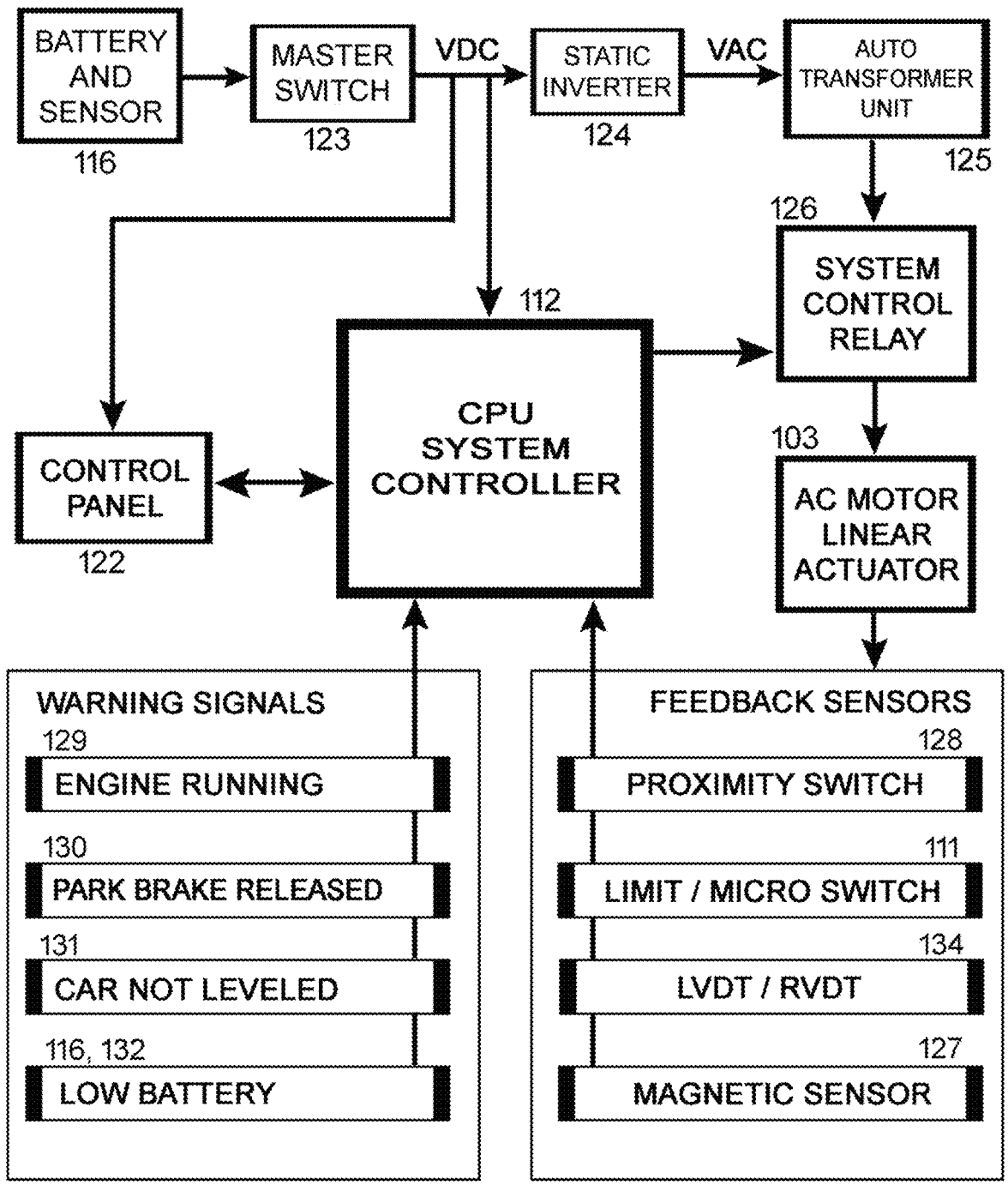
FIG. 8 is a flowchart showing various electrical components, and their interconnectivity, as applicable with an actuator powered by alternating current (AC); in accordance with an exemplary embodiment of the present invention.
Figure 9:
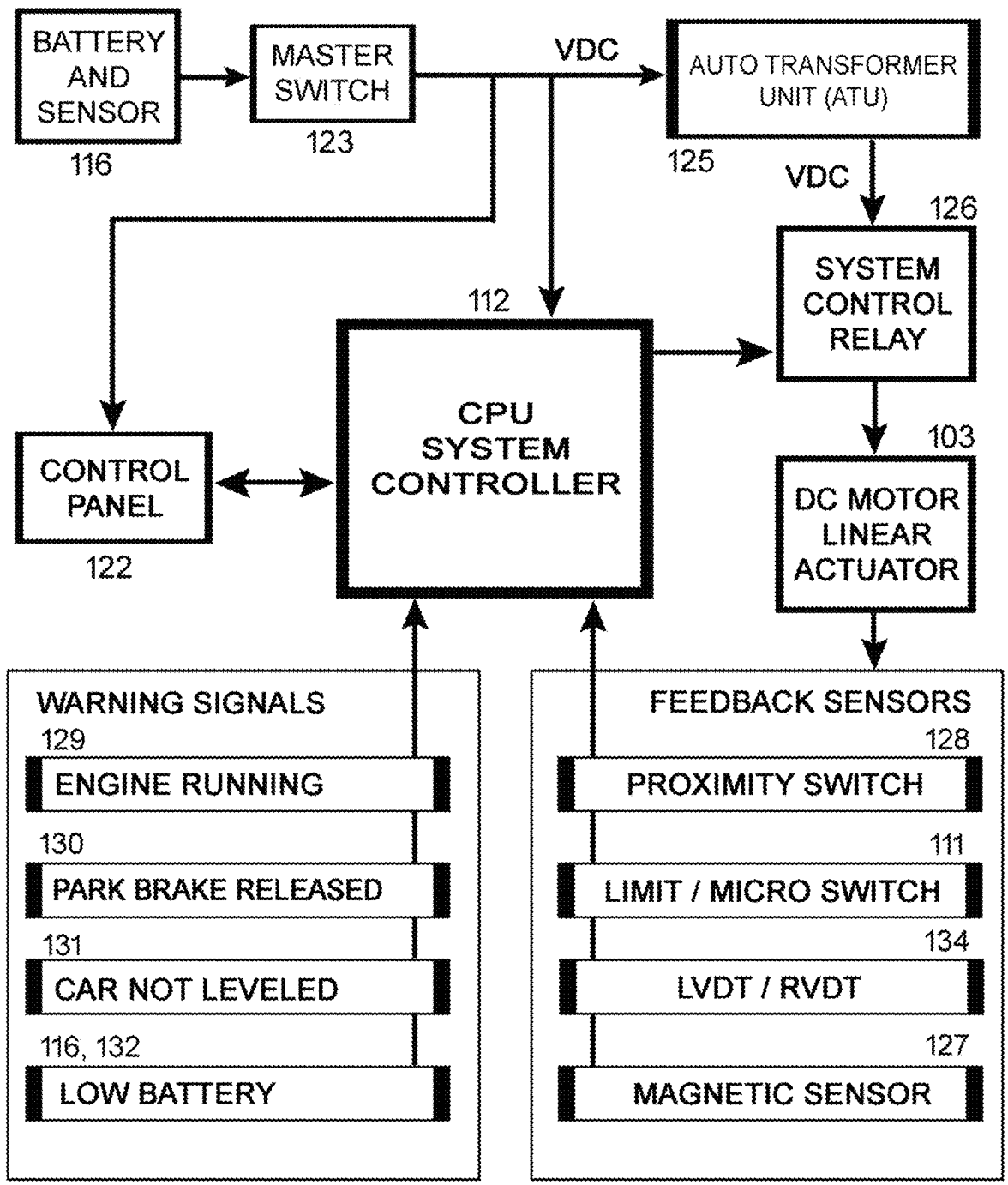
FIG. 9 is a flowchart showing various electrical components, and their interconnectivity, as applicable with an actuator powered by direct current (DC); in accordance with an exemplary embodiment of the present invention.

The movement of the motor-to-actuator connecting mechanism 118 is tracked by the plurality of strategically positioned rotary variable differential transformer (RVDT) 134, feeding the recorded signals to the system controller 112, as shown in FIGS. 8 and 9. This connection method may be retrofitted to accommodate a mechanism designed to, in alternative, use a pneumatic or hydraulic telescoping actuators.

The multi-stage actuator 103 (or actuator), is protected from distractive external elements by being situated inside an actuator compartment 102, located inside a housing 101. As shown in FIGS. 3 and 4, the housing can be accessed via a retractable, electric doors 107. The electric door 107 is located inside the housing's 101 controls compartment 106. The door 107 is attached to a linear slide 108, which is powered by a door motor (DC motor) and configured to move horizontally, via a motor-to-door connecting mechanism 110. As shown in FIGS. 3, 4, 8 and 9, the movement of the door 107 is tracked by two limit switches 111, which signal the door's 107 movement to the system controller 112. The systems controller 112 is configured not to activate the actuator 103 when the retractable, electric door 107 is closed.

As shown in FIGS. 3, 4, and 5, the actuator is equipped with a high load universal joint 104, and attached thereto durable, non-skid plate 105. The universal joint 104 enables angular displacements between the actuator 103 and the non-skid plate 105. Acting in unity, the universal joint 104 and the non-skid plate 105, ensures that the vehicle being elevated remains level on uneven ground, and during the operation of the Elevation System 100.

The level positioning of the vehicle is determined via the usage of plurality of interconnected car level sensors 131, located in the vehicle connection module 133, and the controls compartment 106. As shown in FIGS. 8 and 9, the system controller 112, is configured to receive signals from multitude of car level sensors 131, via the power and communication conduit 119, and using a preprogrammed algorithm determines if the vehicle is sufficiently level to extend the actuator 103. If the system controller 112 determines that the vehicle is not level, or does not meet the pre-determined positioning criteria, the system safety check 214 will send the signal indicating the vehicle is not level, and the operation of the Elevation System 100 will be stopped.

Figure 6:
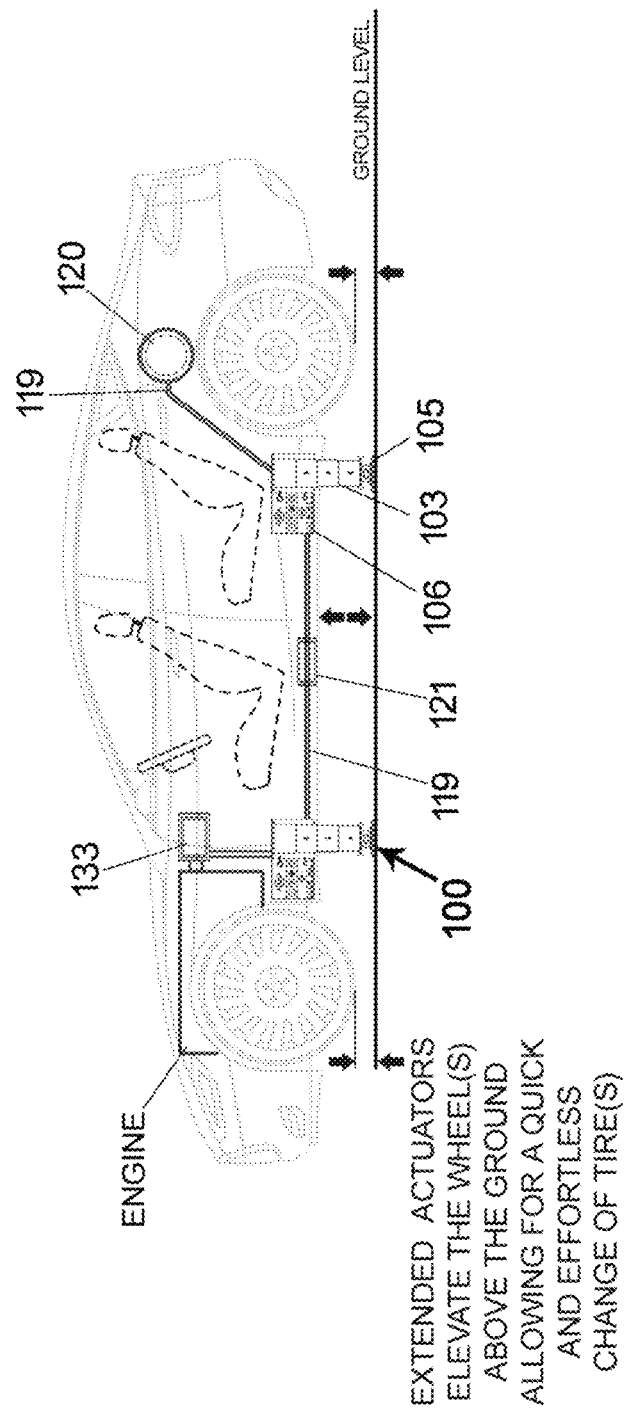
FIG. 6 is a side view of a vehicle elevated off the ground using the present invention; the figure also shows the positioning of the vehicle connecting module, power and communication conduit, and the compressor (if utilizing a pneumatic power) or a reservoir/pump (if utilizing a hydraulic system); in accordance with an exemplary embodiment of the present invention.

However, if the system controller 112 determines that the vehicle is level, the retractable electric door 107 will be retracted, and the actuator 103 will be extended downward until the non-skid plate 105 meets the ground, and the vehicle is raised several inches off the ground, as shown in FIG. 6. The movement of the actuator is tracked by a plurality of linear variable differential transformers (LVDT) 134. LVDT is a common type of electromechanical transducer that can convert the rectilinear motion of an object to which it is coupled mechanically into a corresponding electrical signal.

To fully observe the actuator's 103 movement, the Elevation System 100 incorporates a plurality of wireless light-emitting diode ("LED") 115. The LEDs 115 are powered by the system battery 116, containing battery charge sensor. The LEDs 115 are configured to charge wirelessly by using the wireless charger transmitter and receiver 115, located inside the controls compartment 106.

The system controller 112 is configured to receive signals from the vehicle via the vehicle-connecting module 133. As shown in FIGS. 8 and 9, this connection enables the functionality of various sensors, including engine running sensor 129, park brake sensor 130.

The end-user may initiate the operation of the Elevation System 100 manually via a control panel 122, by using a master switch 123, or via a mobile application 200. The mobile communication is enabled via the Wi-Fi transmitter/receiver (Bluetooth enabling) 113, located in the controls compartment 106. The components situated in the compartment 106 are powered by the system battery 116, which is supplemented by the vehicle's primary battery system, connected to the vehicle via the vehicle-connecting module 133, and delivered to the systems battery 116 using the power and communication conduit 119.

Figure 10:
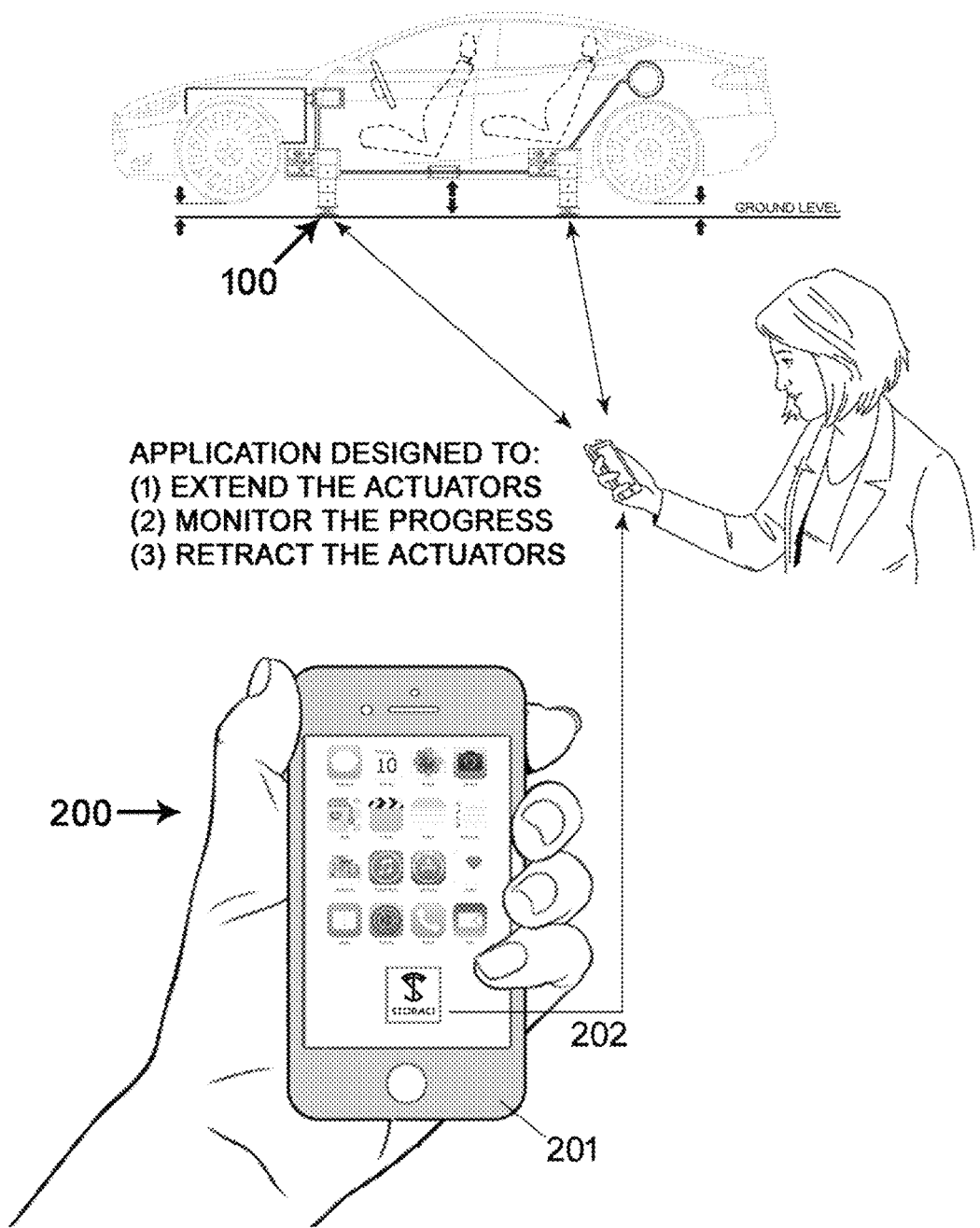
FIG. 10 illustrates that the functionality of the Elevation System may be controlled by a mobile application; wherein the said application is able to (1) extend the actuator; (2) monitor the progress of the actuator's extension and its continued, uninterrupted functionality; and (3) retract the actuator; in accordance with an exemplary embodiment of the present invention.
Figure 11:
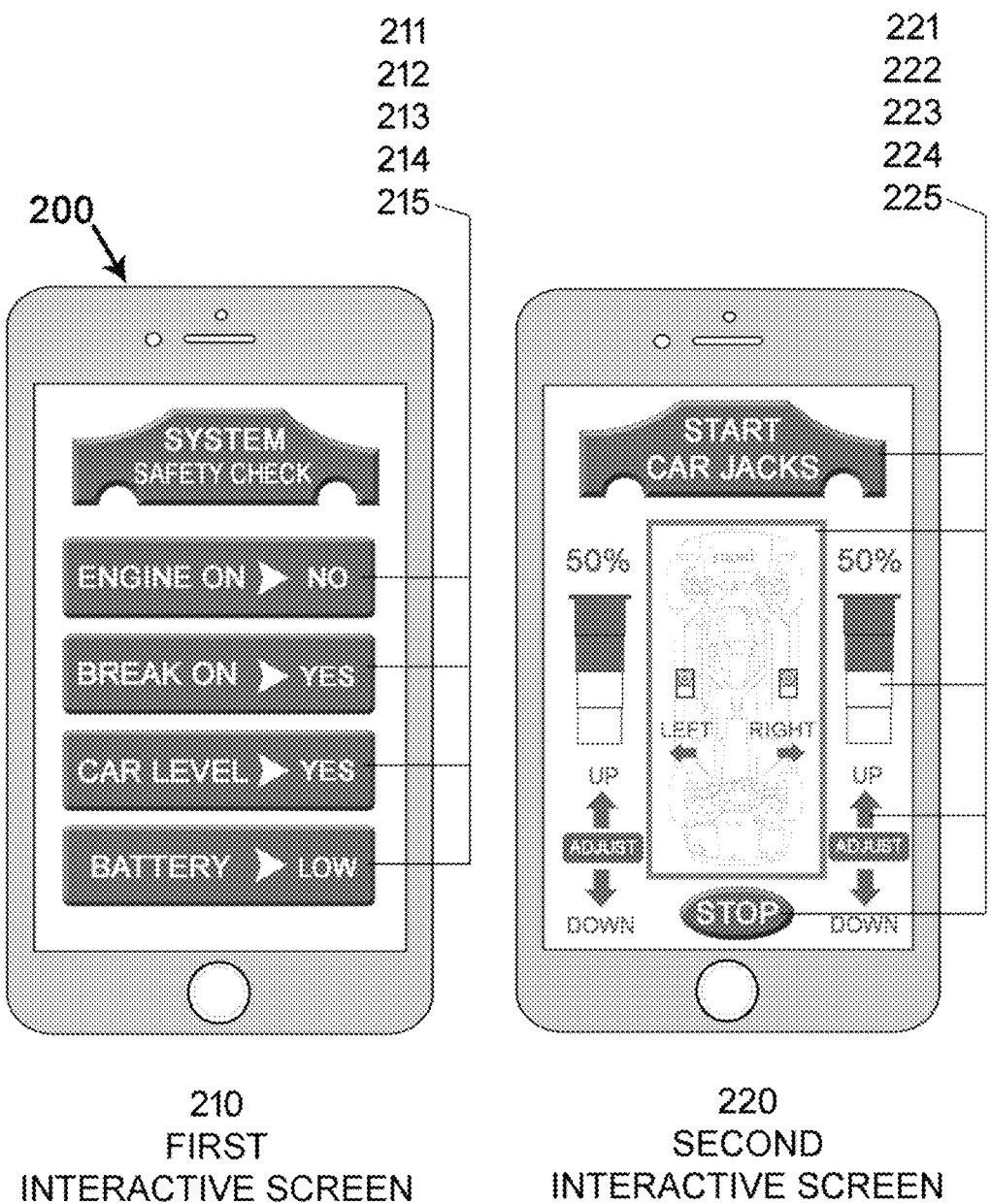
FIG. 11 shows two interactive screens of the mobile application designed to control the functionality of the Elevation System; wherein the first interactive screen enables the end-user to perform a system safety check, by using the system check action button, which generates responses via various informative indicators/responses, including (1) engine on; (2) brake on; (3) car level; (4) battery low or full; the second interactive screen allows the end-user to start the elevation process, monitor its progress, and adjust, or stop, the elevation when necessary; in accordance with an exemplary embodiment of the present invention.

As shown in FIGS. 10 and 11, the mobile application 200, via interactive screens, allows the end-user to perform the vehicle safety check, extend the actuator, monitor the actuator progress, adjust or stop the actuator's functions, and retract the actuator. The mobile application 200 may be uploaded to a mobile phone 201, and with a push of a button 202 the end-user will be able to see the first interactive screen 210.

The first interactive screen 210 displays the system check action button 211. If activated, the application 200 will scan the information provided by the warning signals to the system controller 112, and display the results on the screen of the phone 201, including: engine on indicator 212, brake on indicator 213, car level indicator 214, and battery level indicator 215.

The second interactive screen 220 allows the end-user to view the positioning of the Elevation System 100 (or car jacks) underneath the vehicle, via car jack positioning view 222. The end-user and with push of a button 221 can start the elevation process. Once the elevation of the vehicle is initiated, the movement of the actuator is displayed by the car jack progress indicator 223. The end-user may at any time stop the elevation by pressing the stop button (car jack stop, action override) 225, or may adjust the positioning of the actuator 103 by using the car jack adjustment action button 224.

We claim:

1. A vehicle elevation system, comprising:
   (A) a housing configured to have all sides enclosed from external environment, wherein said housing further consists of an actuator compartment, and a controls compartment; the controls compartment is interconnected with the actuator compartment; the actuator compartment has a bottom side open to external environment;
   (B) a retractable electric door disposed horizontally inside the controls compartment, configured to close or to open the bottom side of the actuator compartment;
   (C) an actuator fixedly located inside the actuator compartment, configured to extend or to retract vertically, wherein said actuator generates a force predetermined to elevate a vehicle above ground;
   (D) a non-skid plate configured to make nonslidable contact with the ground;
   (E) a high load universal joint sandwiched between the actuator and the non-skid plate, for adjusting pivotally thereby allowing the non-skid plate to align with the ground having uneven surface;
   (F) a system controller disposed inside the controls compartment, configured to process information collected by a plurality of sensors, and to execute preprogrammed instructions;
   (G) a wireless networking transmitter receiver disposed inside the controls compartment, configured to establish short range wireless communications with mobile phones, or other devices using wireless communications;
   (H) a system battery disposed inside the controls compartment, for powering the vehicle elevation system;
   (I) a control panel, disposed inside the controls compartment, for manually controlling the vehicle elevation system;
   (J) a master switch, located inside the control panel, for activating or deactivating the vehicle elevation system;
   (K) a mobile application for remotely activating or deactivating the vehicle elevation system, configured to use the wireless networking transmitter receiver to communicate with the mobile phones or other electronic devices using wireless communication systems; and
   (L) wherein by using the master switch, or by using the mobile application,
      (a) a start signal is sent to the system controller triggering retraction of the retractable electric door, thereby opening the bottom side of the actuator compartment,
      (b) the retractable electric door in fully retracted position triggers a limit switch and by doing so instructs the actuator to extend,
      (c) the actuator in extended position causes the non-skid plate to push against the ground having even surface or uneven surface,
      (d) the high load universal joint adjusts pivotally allowing the non-skid plate to align with the ground having uneven surface,
      (e) the high load universal joint transmits the force generated by the actuator onto the non-skid plate, thereby lifting the vehicle above the ground.

2. The vehicle elevation system of claim 1 wherein said plurality of sensors disposed inside the controls compartment feeding information to the system controller is selected from a group consisting of
   (A) proximity switch;
   (B) limit switch;
   (C) micro switch;
   (D) magnetic sensor;
   (E) linear variable differential transformer; and
   (F) rotary variable differential transformer.

3. The vehicle elevation system of claim 1 wherein said retractable electric door is disposed on a linear slide configured to move horizontally thereby opening or closing the bottom side of the actuator compartment.

4. The vehicle elevation system of claim 3 wherein
   (A) said linear slide is movable via a door motor; and
   (B) wherein said door motor is controllably coupled to the linear slide via a motor-to-door connecting mechanism.

5. The vehicle elevation system of claim 1 wherein said actuator is a multi-stage actuator; wherein movement of the multi-stage actuator is tracked using at least one proximity switch or at least one magnetic sensor.

6. The vehicle elevation system of claim 1 wherein said extension of the actuator is tracked using at least one proximity switch or at least one magnetic sensor.

7. The vehicle elevation system of claim 1 wherein said actuator is powered by a system selected from a group consisting of
   (A) a direct current motor;
   (B) an alternating current motor;
   (C) a pneumatic system using a compressor and a check valve; and
   (D) a hydraulic system using a pump, a reservoir, and a check valve.

8. The vehicle elevation system of claim 7 wherein said direct current motor or the alternating current motor is connected to the actuator using a motor-to-actuator connecting mechanism.

9. The vehicle elevation system of claim 1 further comprising
   (A) a vehicle-connecting module which via a power and communication conduit connects the vehicle elevation system to a vehicle control system; and
   (B) wherein said vehicle-connecting module is configured to generate warning signals addressing operational status of the vehicle; the warning signals are sent to the system controller.

10. The vehicle elevation system of claim 9 wherein said warning signals comprise of an engine running, and a park brake released.

11. The vehicle elevation system of claim 1 wherein said system battery further comprises of a battery charge sensor for indicating the system battery state of charge.

12. The vehicle elevation system of claim 1 further comprising
   (A) a car battery charge sensor for indicating a vehicle battery state of charge; and
   (B) wherein said vehicle battery is used to supplement power generated by the system battery.

13. The vehicle elevation system of claim 1 further comprising
(A) a plurality of wireless light-emitting diodes, disposed between the actuator and the high load universal joint;
(B) said plurality of wireless light-emitting diodes is configured to illuminate the vehicle elevation system and the ground; and
(C) wherein said wireless light-emitting diodes are powered by the system battery using a wireless charger transmitter and receiver.

14. The vehicle elevation system of claim 1 wherein said mobile application further comprises of a first interactive screen and a second interactive screen.

15. The vehicle elevation system of claim 14 wherein
(A) said first interactive screen is configured to display in pre-determined manner an action button and a plurality of indicators;
(B) said action button is system check action button; and
(C) said indicators comprise of engine on indicator, brake on indicator, car level indicator, battery level indicator.

16. The vehicle elevation system of claim 15 wherein said system check action button is configured upon manual engagement to retrieve and to display information collected by
(A) an engine running sensor;
(B) a park brake sensor;
(C) a car level sensors; and
(D) a battery charge sensor.

17. The vehicle elevation system of claim 14 wherein
(A) said second interactive screen is configured to display in pre-determined manner a plurality of action buttons and indicators;
(B) said action buttons comprise of start car jack, car jack adjustment, and stop;
(C) said indicators comprise of car jack progress indicator, car jack positioning view.

18. The vehicle elevation system of claim 17 wherein
(A) said start car jack is configured upon manual engagement to open the bottom side of the actuator compartment and fully extend the actuator;
(B) said car jack adjustment is configured upon manual engagement to incrementally retract or to incrementally extend the actuator; and
(C) said stop is configured upon manual engagement to stop extension of the actuator.

19. The vehicle elevation system of claim 17 wherein
(A) said car jack progress indicator is configured to display progress of extending the actuator; and
(B) said car jack positioning view is configured to display location of the actuator.

* * * * *